US012626985B2

(12) United States Patent
Yoshida et al.

(10) Patent No.: US 12,626,985 B2
(45) Date of Patent: May 12, 2026

(54) BATTERY PACK, ELECTRICAL DEVICE, AND ELECTRICAL DEVICE MAIN BODY

(71) Applicant: Koki Holdings Co., Ltd., Tokyo (JP)

(72) Inventors: Toshiyuki Yoshida, Ibaraki (JP); Hiroyuki Hanawa, Ibaraki (JP); Shota Kanno, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 504 days.

(21) Appl. No.: 18/037,076

(22) PCT Filed: Oct. 29, 2021

(86) PCT No.: PCT/JP2021/039958
§ 371 (c)(1),
(2) Date: May 15, 2023

(87) PCT Pub. No.: WO2022/113644
PCT Pub. Date: Jun. 2, 2022

(65) Prior Publication Data
US 2023/0420775 A1 Dec. 28, 2023

(30) Foreign Application Priority Data

Nov. 27, 2020 (JP) ................................. 2020-196807

(51) Int. Cl.
*H01M 50/213* (2021.01)
*H01M 50/202* (2021.01)
(Continued)

(52) U.S. Cl.
CPC ....... *H01M 50/213* (2021.01); *H01M 50/202* (2021.01); *H01M 50/244* (2021.01); *H01M 50/247* (2021.01); *H01M 50/284* (2021.01)

(58) Field of Classification Search
CPC ............. H01M 50/247; H01M 50/213; H01M 50/296; H01M 50/202; H01M 50/244; H01M 50/284
See application file for complete search history.

(56) References Cited

U.S. PATENT DOCUMENTS

2014/0154535 A1  6/2014  Olsson et al.
2021/0234225 A1* 7/2021  Takeda ................... B25D 17/00

FOREIGN PATENT DOCUMENTS

CN    203013831 X    6/2013
CN    105322608      2/2016
(Continued)

OTHER PUBLICATIONS

"International Search Report (Form PCT/ISA/210) of PCT/JP2021/039958", mailed on Dec. 14, 2021, with English translation thereof, pp. 1-4.
"Search Report of Europe Counterpart Application", issued on Jun. 21, 2024, p. 1-p. 8.
"Office Action of China Counterpart Application", with English translation thereof, issued on Jun. 21, 2025, pp. 1-12.
(Continued)

*Primary Examiner* — Karie O'Neill Apicella
(74) *Attorney, Agent, or Firm* — JCIPRNET

(57) ABSTRACT
A battery pack includes: a first case having a slot portion exposing a battery-side terminal portion and a guide portion guiding attachment to an electrical device main body; a second case defining a space accommodating a battery cell by being joined with the first case; a separator holding the battery cell; a circuit board fixed to a side of the separator facing the first case; and the battery-side terminal portion is fixed at a position corresponding to the slot portion of the circuit board and connectable to a main body side terminal of an electrical device main body. The separator has a connecting portion provided around the circuit board when viewed from above, at a position facing the first case, and the
(Continued)

first case has a connected portion connected to the connecting portion at a portion corresponding to the connecting portion.

12 Claims, 10 Drawing Sheets

(51) Int. Cl.
    *H01M 50/244*     (2021.01)
    *H01M 50/247*     (2021.01)
    *H01M 50/284*     (2021.01)

(56)                References Cited

FOREIGN PATENT DOCUMENTS

| | | |
|---|---|---|
| CN | 110832669 | 2/2020 |
| CN | 111725458 | 9/2020 |
| JP | 2013114780 | 6/2013 |
| JP | 2016018604 | 2/2016 |
| JP | 2019046588 | 3/2019 |
| JP | 2021057255 | 4/2021 |
| WO | 2013077176 | 5/2013 |
| WO | 2019017184 | 1/2019 |
| WO | 2020110655 | 6/2020 |

OTHER PUBLICATIONS

"Office Action of Japan Counterpart Application", issued on Jul. 16, 2024, with English translation thereof, p. 1-p. 12.

* cited by examiner (A)

(B)

(A)

(B)

(A)

(B)

BATTERY PACK, ELECTRICAL DEVICE, AND ELECTRICAL DEVICE MAIN BODY

CROSS-REFERENCE TO RELATED APPLICATION

This application is a 371 application of the International PCT application serial no. PCT/JP2021/039958, filed on Oct. 29, 2021, which claims the priority benefits of Japan Patent Application No. 2020-196807, filed on Nov. 27, 2020. The entirety of each of the above-mentioned patent applications is hereby incorporated by reference herein and made a part of this specification.

TECHNICAL FIELD

This invention relates to a battery pack, an electrical device, and an electrical device main body.

RELATED ART

Cordless electrical devices driven by battery packs using secondary batteries such as lithium ion batteries are widely used. For example, in a hand-held electric tool that drives a front tool by a motor, a battery pack that accommodates multiple secondary battery cells is used as a power source, and electric energy stored in the battery pack is used to drive a load device such as a motor. The battery pack is configured to be detachable from an electrical device main body, and when the voltage drops due to discharge, the battery pack is removed from the electrical device main body and charged using an external charger. As an example of such a battery pack, the technique disclosed in Patent Literature 1 is known. In Patent Literature 1, a battery cell and a separator holding the battery cell are accommodated in a case, and a latch mechanism for attachment and detachment to and from the electrical device main body is provided.

CITATION LIST

Patent Literature

[Patent Literature 1] JP 2019-46588 A

SUMMARY OF INVENTION

Technical Problems

In the configuration of Patent Literature 1, in the state that the battery pack is attached to the electrical device main body, there is a possibility that the battery cell (terminal portion) may shift when the lower case is separated from the upper case for some reasons (such as aging). In order to prevent the terminal portions from being shifted from the upper case, it is conceivable to fix the terminal portions to the upper case side, but when the battery cell and separator are accommodated in the lower case, and only the terminal portion side is fixed to the upper case, there is a problem that the assemblability is deteriorated. It is also conceivable to fix the battery cell (separator) and the terminal portion to the upper case, but depending on the fixing method, it is necessary to provide a through hole in the circuit board placed above the separator, and there is a problem that the region for arranging components on the circuit board become narrower, or that the area of the board needs to be increased.

This invention has been made in view of the above background, and an object of this invention is to provide a battery pack in which the terminal portion of the battery pack is prevented from being shifted from the case side constituting a rail portion, and an electrical device using the same. Another object of this invention is to provide a battery pack capable of stably holding a case in which a rail portion of a battery pack is arranged and an assembly for fixing the terminal portion or suppressing breakage when disassembled or damaged, without impeding the assemblability of the battery pack, and an electrical device using the same. Still another object of this invention is to provide a battery pack and an electrical device that do not increase the area (narrow the component arrangement area) of the circuit board of the battery pack.

Solution to Problem

The typical features of the invention disclosed in the present application are as follows. According to one feature of this invention, a battery pack includes: a first case having a slot portion for exposing a battery-side terminal portion and a guide portion for guiding attachment to an electrical device main body; a second case defining a space for accommodating a battery cell by being joined with the first case; a separator holding the battery cell; a circuit board fixed to a side of the separator facing the first case; and the battery-side terminal portion is fixed at a position corresponding to the slot portion of the circuit board and configured to be connectable to a main body side terminal of an electrical device main body. The separator has a connecting portion provided around the circuit board when viewed from above, at a position facing the first case, and the first case has a connected portion connected to the connecting portion at a portion corresponding to the connecting portion. The connecting portion is a hook formed on one side of the separator side or the first case, and the connected portion is a concave portion formed on the other side of the separator side or the first case. When separating the joined first case the second case, the separator is held on the side of the first case in a locked state between the hook and the concave portion. Further, in the battery pack, the locked state is maintained in a contact state or a non-contact state between the hook and the concave portion when the first case and the second case are joined together.

According to another feature of this invention, a plurality of screw holes are provided on one side of the first case and the second case of the battery pack; and a plurality of female screws corresponding to the screw holes are provided on the other side of the first case and the second case. The first case and the second case are screwed together with a plurality of screws while the separators are accommodated in the first case and the second case. A longitudinal direction of the screw is oriented in the same direction as the direction of joining, and an extending direction of the connecting portion is formed in a direction orthogonal to the joining direction. Moreover, the battery-side terminal portion of the battery pack has a plurality of terminals arranged in parallel on the circuit board, and the connecting portion has a first connecting portions provided at a location located on both sides of the plurality of terminals in a parallel direction. Further, the battery cell is cylindrical and supported by the separator so as to extend in the parallel direction of the plurality of terminals, and the connecting portion has a second connecting portion provided at an end portion of the separator in a front-rear direction, near a center in the parallel direction.

The second connecting portion is preferably provided on both sides of the separator in the front-rear direction.

According to still another feature of this invention, the first case of the battery pack has a protruding portion that protrudes inward from an inner wall of the first case in order to restrict movement of the battery cells in the space, and the connected portion is provided on the protruding portion. Moreover, the battery pack has a latch mechanism provided in the first case for attachment and detachment to and from the electrical device main body, and the latch mechanism is positioned between the separator and the first case in a state in which the connecting portion and the connected portion are held. Further, the connecting portion of the battery pack has a hole provided in the separator, and a fastening member provided separately from the separator and penetrating the hole. The connected portion has a fastening hole into which the fastening member is inserted.

According to still another feature of this invention, a battery pack includes a first case having a slot portion for exposing a battery-side terminal portion and a guide portion for guiding attachment to an electrical device main body; a second case for defining a space for accommodating a plurality of battery cells by being joined to the first case; a separator holding the battery cells; a circuit board fixed to a side of the separator facing the first case; and the battery-side terminal portion fixed at a position corresponding to the slot portion of the circuit board and configured to be connectable to a main body side terminal portion of the electrical device main body. The separator has a connecting portion that extends around the circuit board when viewed from above, and the second case has a connected portion connected to the connecting portion. The connecting portion is a hook provided integrally with the separator, and the connected portion is a concave portion provided in the second case. An electrical device is composed of the battery pack configured as described above; and an electrical device main body having a battery pack attachment portion to which the battery pack is attached, and a main body side terminal portion provided in the battery pack attachment portion and connected to the battery-side terminal portion.

Effects of Invention

According to this invention, it is possible to provide a battery pack suppressing the terminal portion of the battery pack being shifted with respect to the case side which constitutes a rail portion, and an electrical device using the same. Moreover, it is possible to provide a battery pack capable of stably holding a case in which a rail portion of a battery pack is arranged and an assembly for fixing the terminal portion or suppressing breakage when disassembled or damaged, without impeding the assemblability of the battery pack, and an electrical device using the same. Moreover, it is possible to provide a battery pack and an electrical device that do not increase the area (narrow the component arrangement area) of the circuit board of the battery pack. To be specific, a connecting portion such as a hook is provided in the assembly (insulator) where the battery-side terminal portion is fixed; and a connected portion such as a concave portion is formed on the first case side where the rail portion is formed when accommodating the assembly in the first case and the second case, and the connecting portion and the connected portion are in a connected state when the first case and the second case are joined together, thus the first case and the assembly are held so as not to separate from each other. In this way, it was possible to make it difficult to separate the first case and the assembly while maintaining the assemblability of the battery pack. In particular, even if a strong impact is applied to the battery pack due to a fall of the electrical device or the like and the first case and the second case are damaged and separated, since there is a high possibility that the connection between the first case and the assembly may be maintained, it is possible to largely avoid shift of the connection with the attached terminal portion of the electrical device main body.

Figure 2:
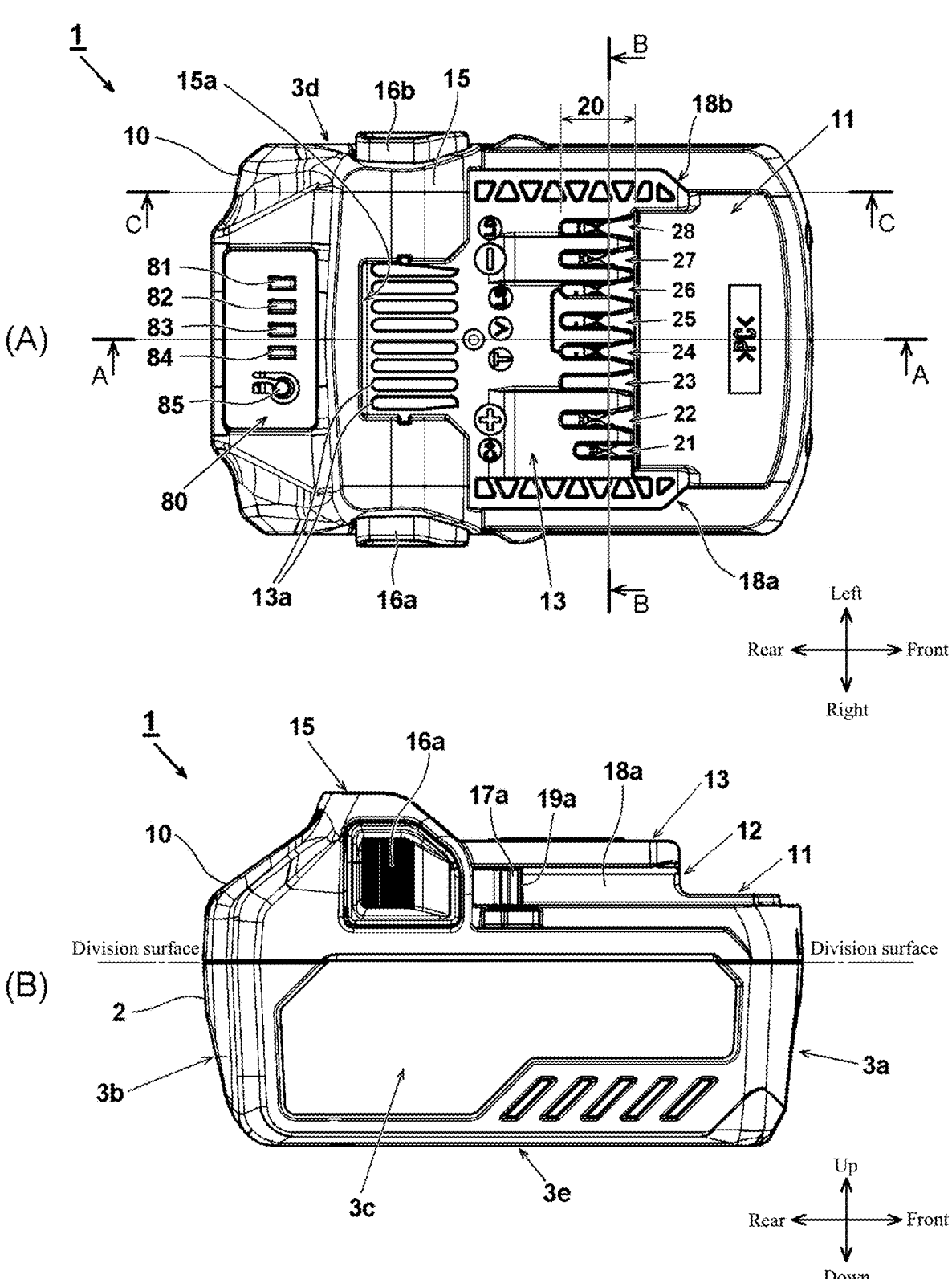
FIG. 2 is an external view of the battery pack 1 according to an embodiment of this invention, where (A) is a top view and (B) is a side view.
Figure 4:
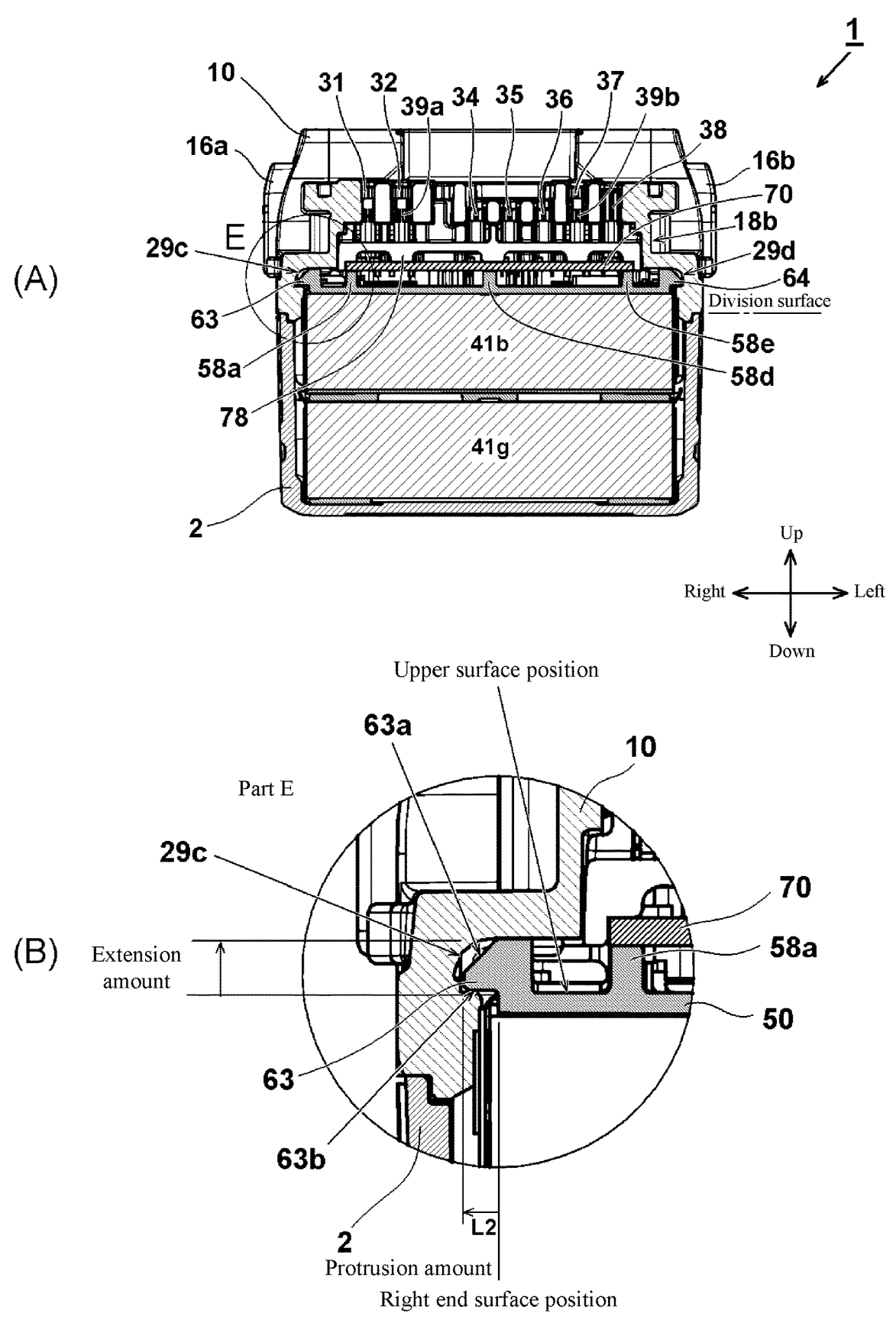

(A) of FIG. 4 is a cross-sectional view taken along line B-B of FIG. 2, and (B) is an enlarged view of part E of (A).

Figure 3:
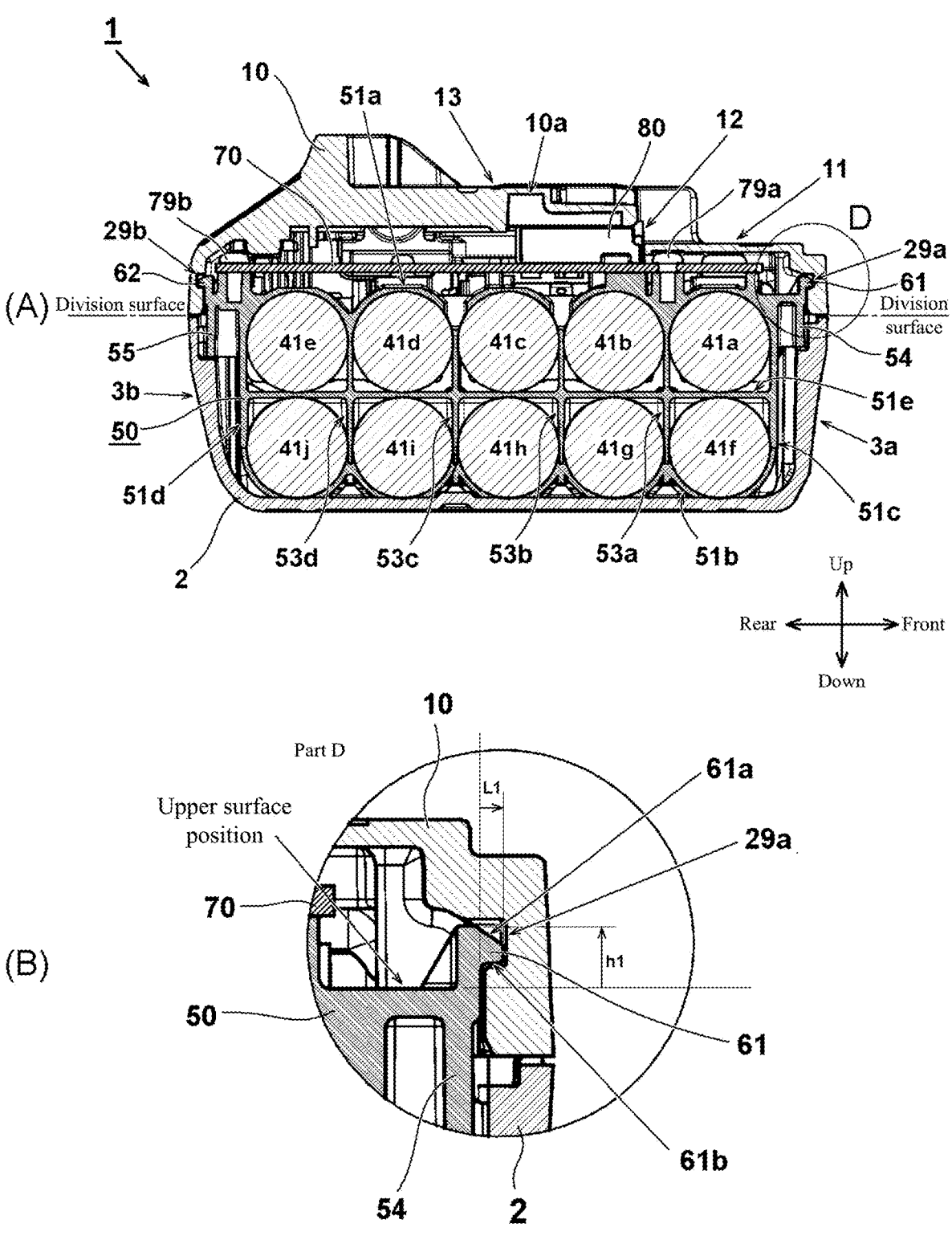
In FIG. 3, (A) is a cross-sectional view taken along line A-A of FIG. 2, and (B) is an enlarged view of part D of (A).
Figure 5:
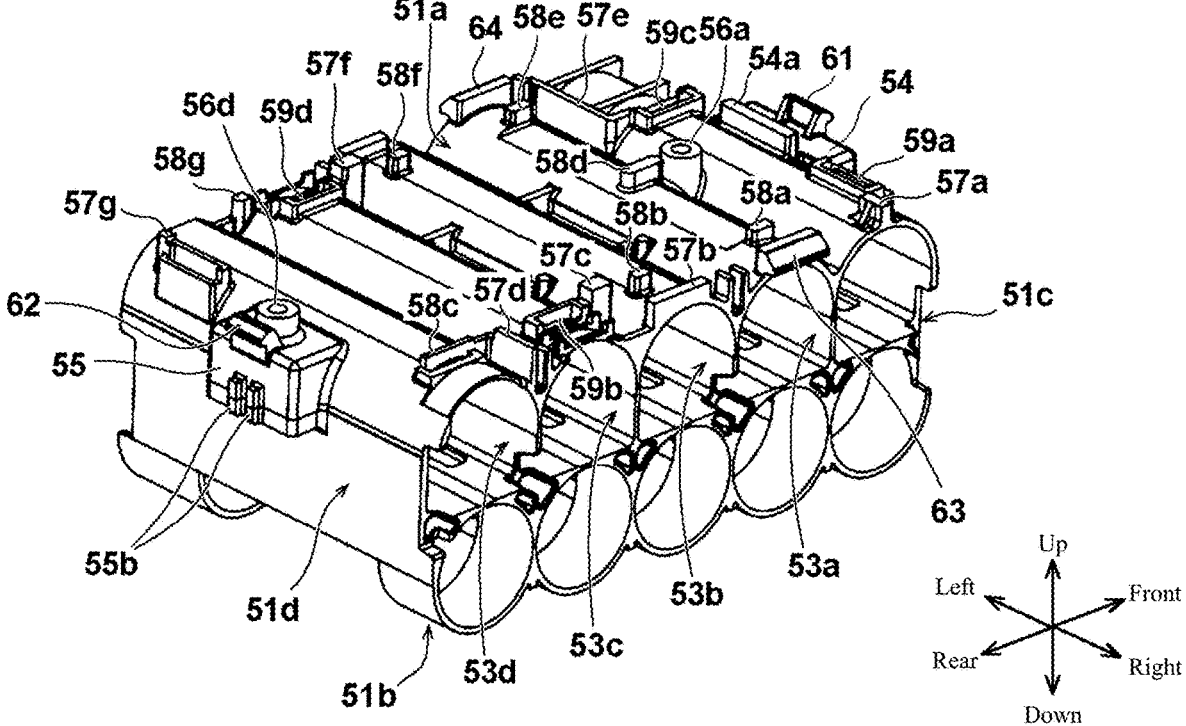

FIG. 5 is a perspective view showing the appearance of a separator 50 alone of FIG. 3.

Figure 1:
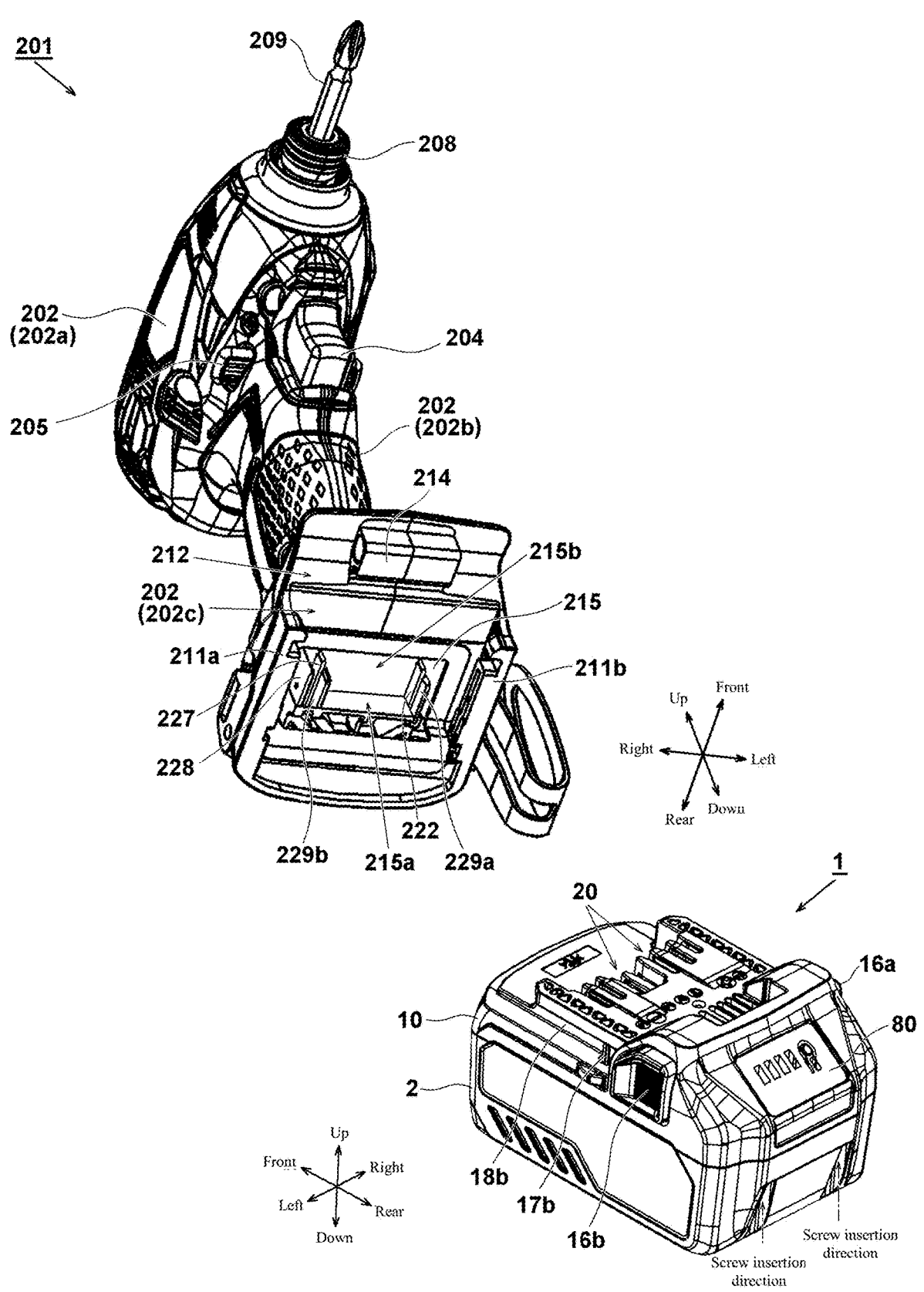
FIG. 1 is a perspective view of an electrical device main body 201 and a battery pack 1 according to an embodiment of the invention.
Figure 6:
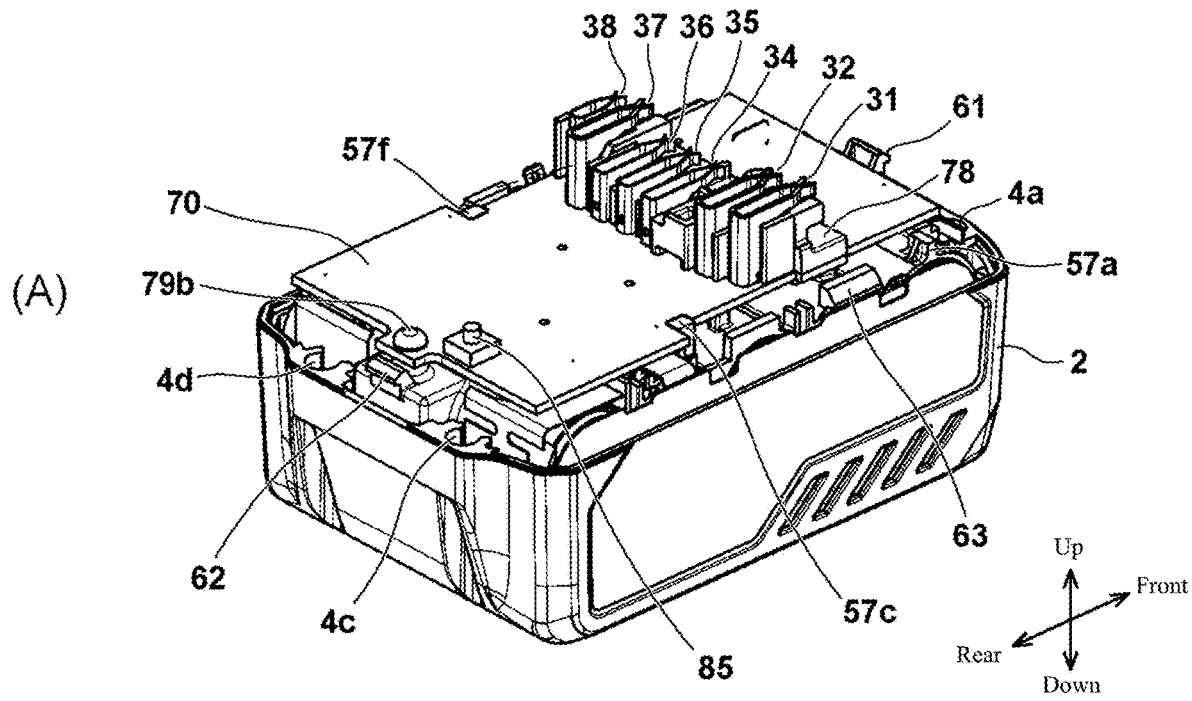
Figure 6:
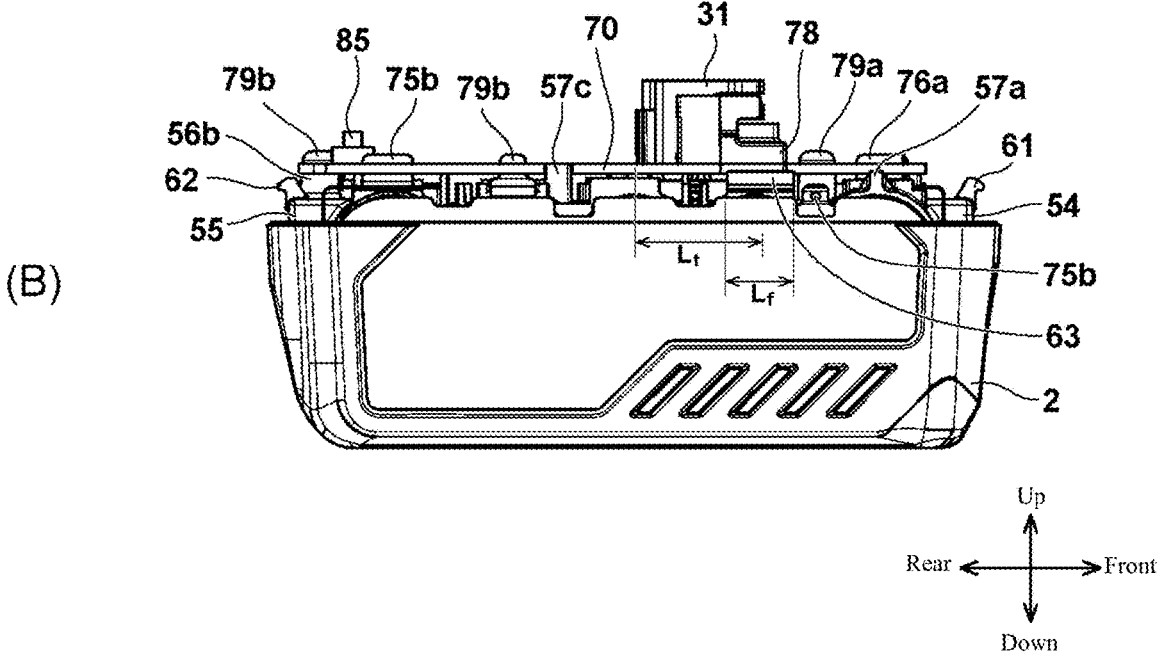

FIG. 6 shows a state in which an upper case 10 of the battery pack 1 of FIG. 1 is removed, where (A) is a perspective view and (B) is a right side view.

Figure 7:
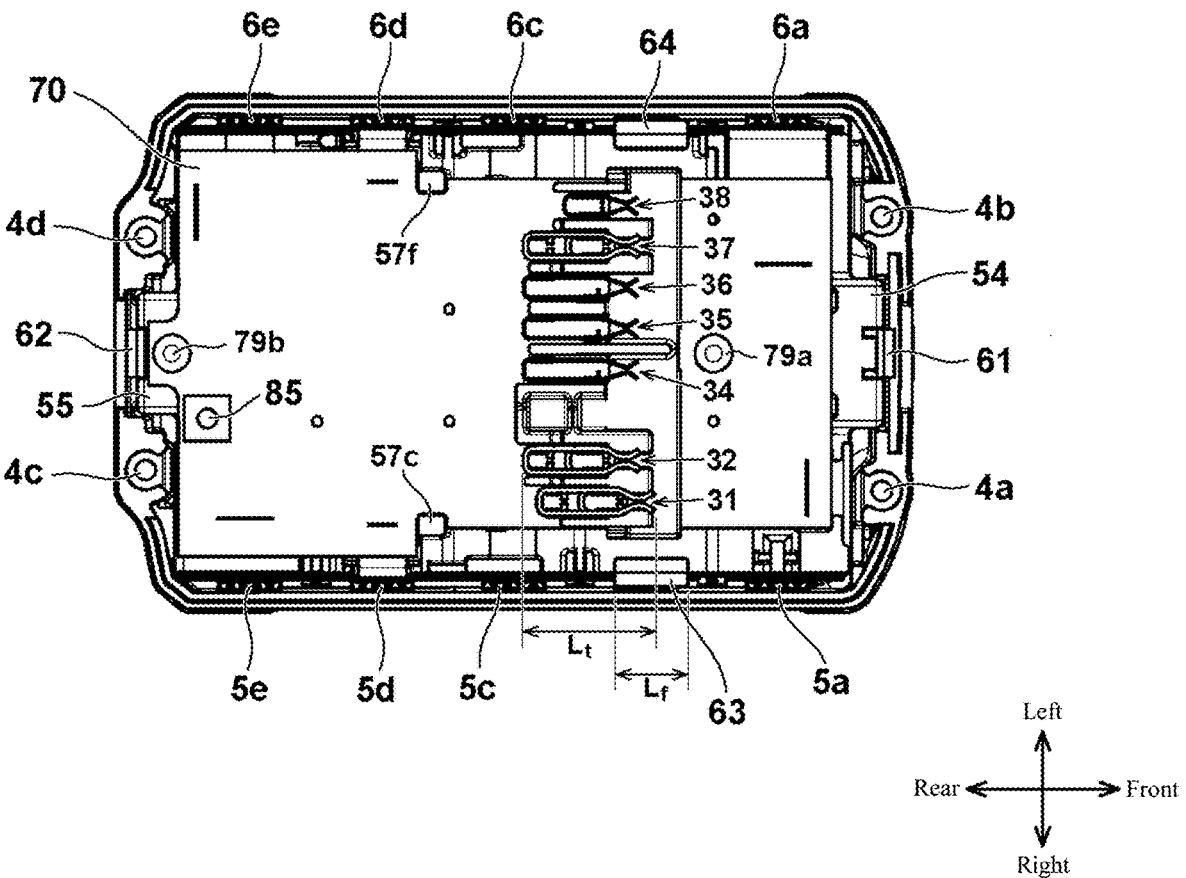

FIG. 7 is a top view of the battery pack 1 of FIG. 1 with the upper case 10 removed.

Figure 8:
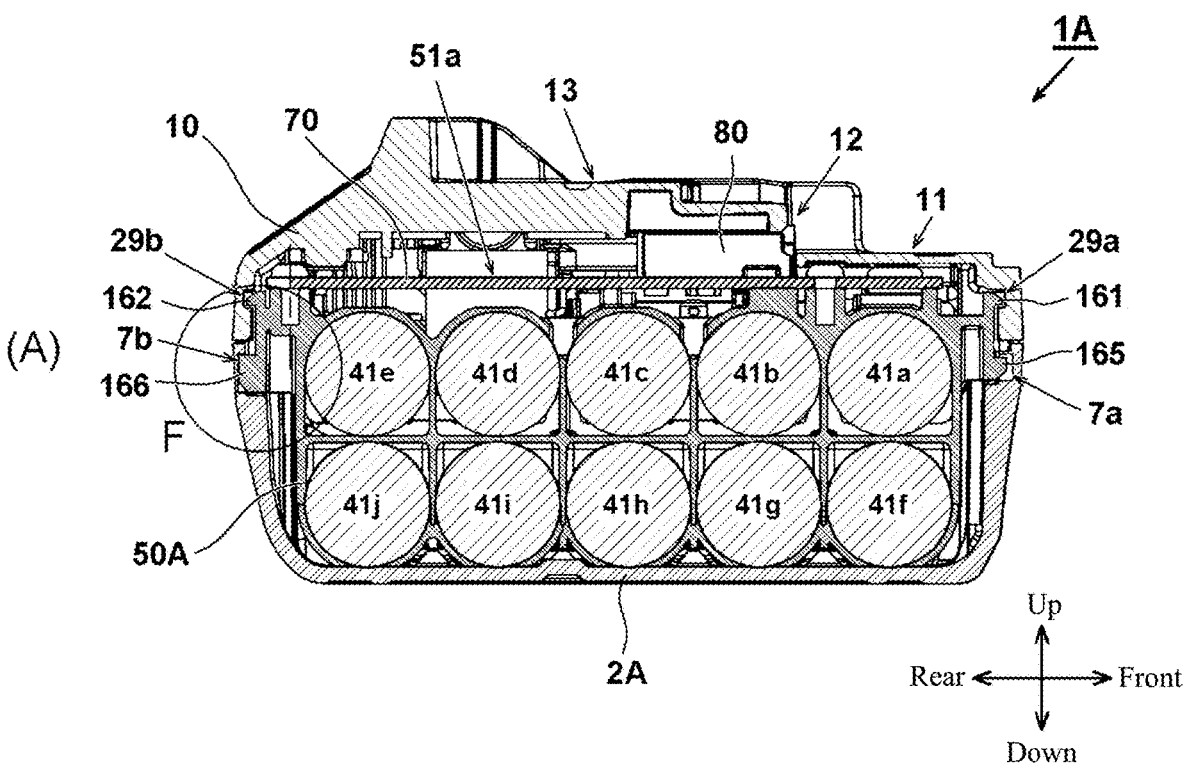
Figure 8:
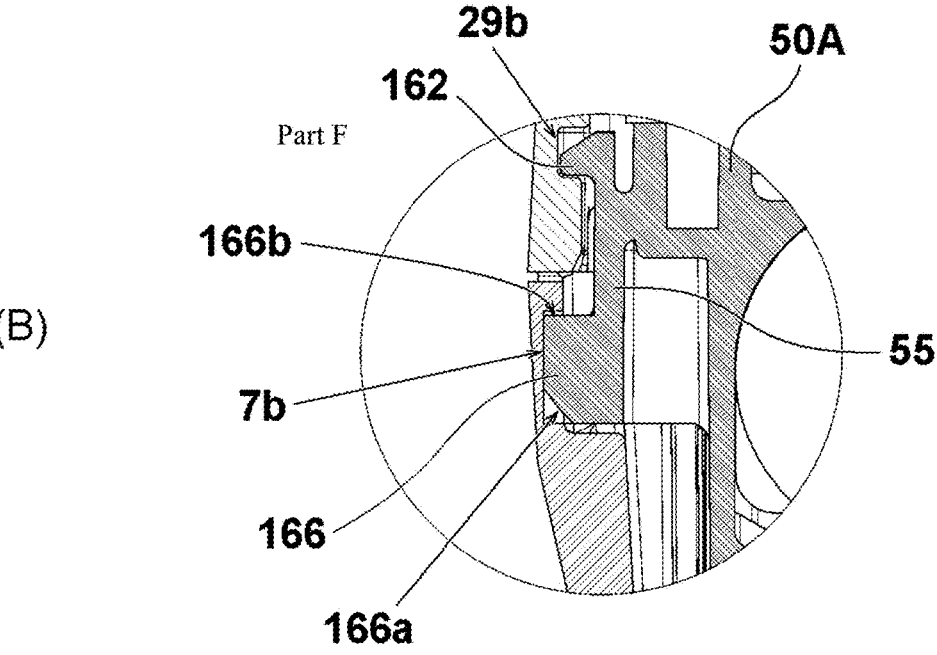

FIG. 8 shows a battery pack 1A according to a second embodiment of this invention, where (A) is a vertical cross-sectional view passing through the left-right center of the battery pack, and (B) is an enlarged view of part F of (A).

Figure 9:
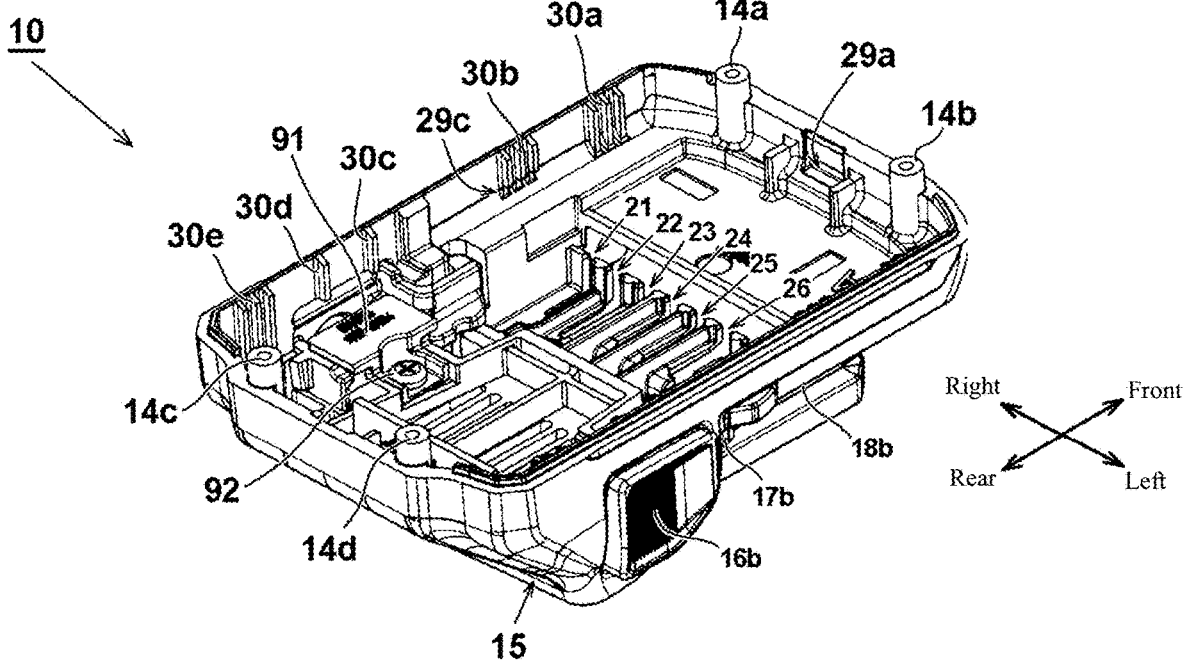

FIG. 9 is a bottom perspective view of the upper case 10 alone of the battery packs 1 and 1A according to the first and second embodiments of this invention.

Figure 10:
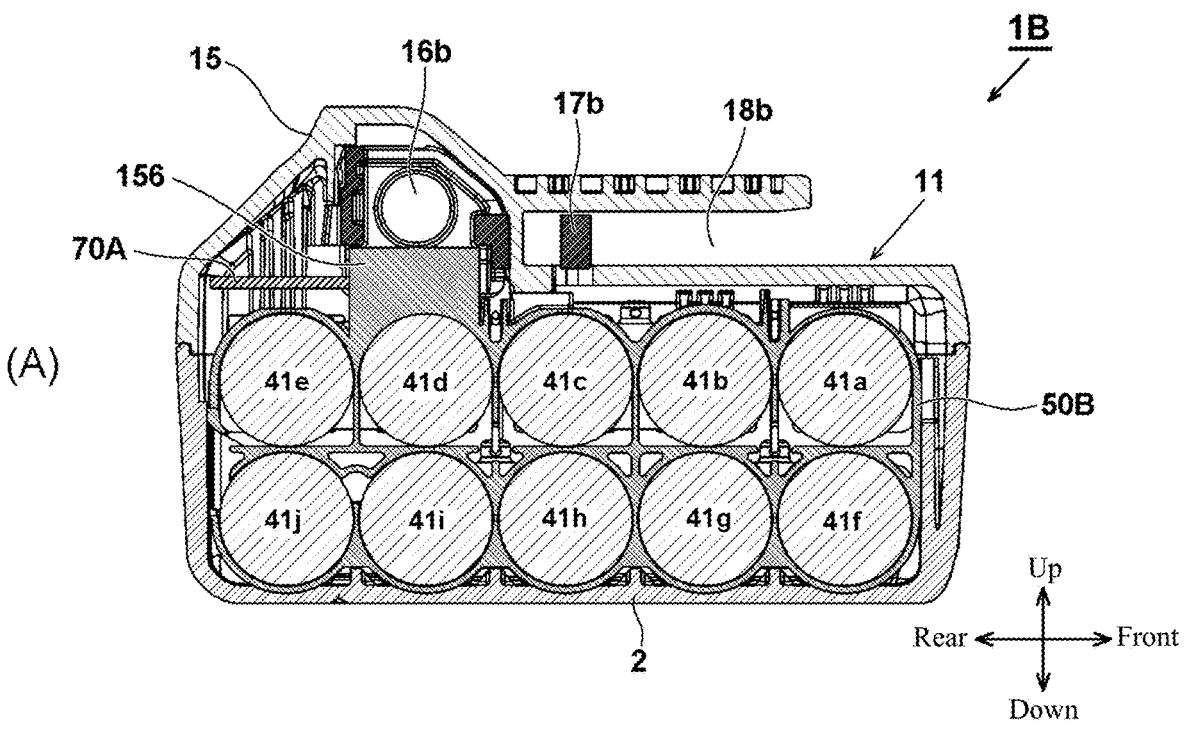
Figure 10:
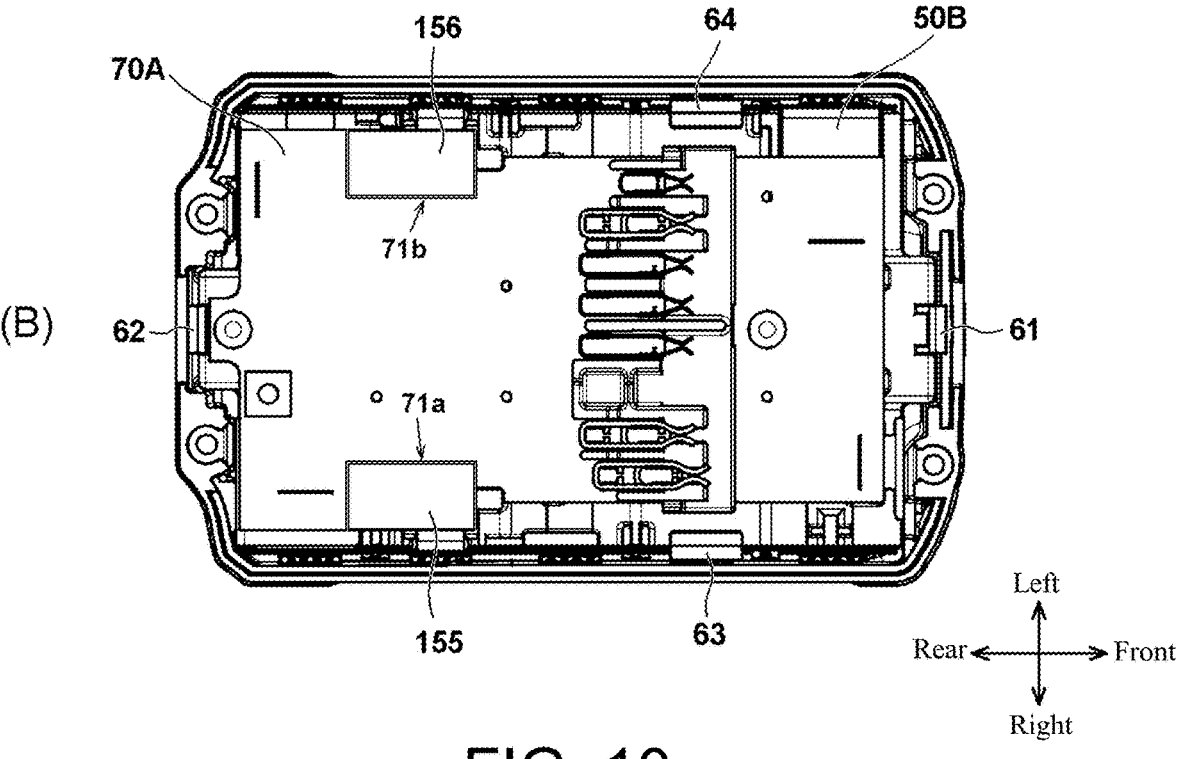

FIG. 10 is a vertical cross-sectional view (corresponding to the cross section of C-C in FIG. 2) of a battery pack 1B according to a third embodiment of this invention, where (B) is a top view of the battery pack 1B with an upper case 10B removed.

DESCRIPTION OF SIDE

Embodiment 1

Embodiments of this invention will be described below with reference to the drawings. In the drawings below, the same parts are denoted by the same reference numerals, and repeated descriptions are omitted. Also, in this specification, the front, back, left, right, and up and down directions of the electrical device main body side and the battery pack are described as the directions shown in the drawings, respectively.

FIG. 1 is a perspective view of an electrical device main body 201 and a battery pack 1 according to an embodiment of the invention. An example of an impact tool with a rated voltage of 36 V is shown as the electrical device main body 201. The electrical device main body 201 uses the detachable battery pack 1 as a power source, and performs tightening work by driving a tip tool 209 using rotational driving force of a motor (not shown). The electrical device main body 201 has a housing 202 which is an outer frame that forms an outer shape. The housing 202 includes a body portion 202a that accommodates a motor and a power transmission mechanism (not shown), a handle portion 202b that extends downward from the body portion 202a, and a battery pack attachment portion 202c that is formed below the handle portion 202b. A trigger-like operation switch 204 is provided at a part of the handle portion 202b near which the index finger touches when the user holds it. A forward/reverse switching lever 205 for switching the rotation direction of the motor is provided above the operation switch 204. An anvil (not visible in the drawing) as an output shaft is provided on the front side of the housing 202, and a tip tool holding portion 208 for attaching the tip tool 209 is provided at the tip of the anvil. Here, a plus driver bit is attached as the tip tool 209.

In the battery pack attachment portion 202c, rail portions 211a and 211b including grooves and rails extending parallel to the front-rear direction are formed in the inner wall portions on the left and right sides, and a terminal portion (main body side terminal portion) 215 is provided between them. The terminal portion 215 is made by integrally molding nonconductive material such as synthetic resin, and has multiple metallic terminals, such as a positive input terminal 222, a negative input terminal 227, an LD terminal (abnormal signal terminal) 228, and series connection terminals 229a and 229b cast therein. The terminal portion 215 is made by casting multiple metal terminals (here, the terminals 222, 227, and 228) by molding synthetic resin, and has a vertical surface 215a that serves as an abutment surface in the attachment direction (front-rear direction) and a horizontal surface 215b. Moreover, in FIG. 1, another terminal group (T terminal, V terminal, LS terminal) for signal transmission provided between or adjacent to the positive input terminal 222 and the negative input terminal 227 in the terminal portion 215 is omitted, but it is optional to any of these terminals to the terminal portion 215.

The terminal portion 215 is fixed so as to be sandwiched between opening portions (terminal holding portion: not visible in the drawing) of the left and right divided housing 202. The horizontal surface 215b of the terminal portion 215 is a surface that is close to and faces an upper step surface 13 on the battery pack 1 side when the battery pack 1 is attached. A curved portion 212 that abuts on a raised portion 15 of the battery pack 1 is formed on the front side of the horizontal surface 215b, and a projecting portion 214 is formed near the left-right center of the curved portion 212. The projecting portion 214 serves as a boss for screwing the housing of the electrical device main body 201 which is divided into two parts in the left-right direction, and also serves as a stopper for restricting the relative movement of the battery pack 1 in the attachment direction.

The battery pack 1 is detachable from the corresponding electrical device main body 201, and accommodates multiple battery cells in the synthetic resin case. In the upper portion of the battery pack 1, rail grooves 18a (not visible in FIG. 1) and 18b for attachment to the electrical device main body 201, a slot portion 20 for realizing electrical connection with the electrical device main body 201, a connection terminal group (to be described later in FIG. 6) arranged at the inner portion of the slot portion 20, and a latch mechanism (latch portion) for maintaining or releasing the attachment state with the electrical device main body 201. The latch mechanism includes latch buttons 16a and 16b and locking hooks 17a (not visible in FIG. 1) and 17b that move in conjunction with the latch buttons 16a and 16b.

The battery pack 1 is a so-called multi-voltage power source capable of outputting either 18V or 36V output. The battery pack 1 may be attached to any one of an electrical device main body (not shown) with a rating of 18V and the electrical device main body 201 with a rating of 36V, and outputs a rated DC of 18V when attached to an electrical device main body with a rating of 18V and a rated DC of 36V when attached to the electrical device main body 201 with a rating of 36V. Moreover, it is arbitrary to configure the output voltage of the battery pack 1 as a low/high voltage switching type or as a single voltage type, and this invention may also be applied to any type of the battery pack. Further, the rated voltage of the battery pack 1 is arbitrary. After the battery pack 1 is removed from the electrical device main body 201, it may be charged using an external charger (not shown).

FIG. 2 is a view showing the battery pack 1 according to an embodiment of this invention, where (A) is a top view and (B) is a right side view. The battery pack 1 defines a space for accommodating multiple battery cells by a synthetic resin housing composed of an upper case (first case) 10 and a lower case (second case) 2. It is important that both an upper case 10 and a lower case 2 are made of nonconductive material, here made by integral molding of polycarbonate. A flat lower step surface 11 is formed on the front side of the upper case 10, and the upper step surface 13 formed higher than the lower step surface 11 is formed near the center. The lower step surface 11 and the upper step surface 13 are formed in a stepped shape, and the connecting portion between them is a stepped portion 12 which is a vertical surface. The slot arrangement region (slot portion) 20 is formed from the stepped portion 12 to the front side portion of the upper step surface 13. In the slot arrangement region 20, multiple (here, eight) notched slots 21-28 are formed on a front surface (the stepped portion 12) perpendicular to an upper surface parallel to the attachment direction (front-rear direction). The slots 21-28 are notched portions having a predetermined length in the battery pack attachment direction (front-rear direction) and a predetermined width in a direction intersecting attachment direction (horizontal direction) of the battery pack, and are notched at the front side end portion located in the stepped portion 12 at a predetermined height in the up-down direction. The width of the stepped portion 12 in the left-right direction is slightly wider than the widths of the slots 21-28 near the rear ends, and is such that the width in the left-right direction narrows toward the rear in the vicinity of the stepped portion 12 to facilitate the insertion of the terminal group on the electrical device main body side.

Two rail grooves 18a and 18b are formed on the side surface of the upper step surface 13 of the upper case (first case) 10. The rail grooves 18a and 18b are formed such that their longitudinal direction is parallel to the attachment direction of the battery pack 1. The groove portions of the rail grooves 18a and 18b have open ends on the front side end portion and closed ends connected to the front side wall surface of the raised portion 15 on the rear side end portion. The slot portion 20 (slots 21-28) is arranged in a region sandwiched between the rail grooves 18a and 18b. The raised portion 15 is formed on the rear side of the upper step surface 13 in a raised manner. The raised portion 15 has an outer shape rising upward from the upper step surface 13, and a depression-like stopper portion 15a is formed in the vicinity of the center thereof. The stopper portion 15a serves as an abutment surface for the projecting portion 214 (see FIG. 1) when the battery pack 1 is attached to the battery pack attachment portion 202c, and when inserted until the projecting portion 214 on the electrical device main body 201 side abuts on the stopper portion 15a, multiple terminals (device-side terminals) provided on the electrical device main body 201 are brought into contact with multiple connection terminals (to be described later in FIG. 4) provided on the battery pack 1, so as to be in a conductive state.

The latch buttons 16a and 16b are provided on the left and right side surfaces of the rear portions of the rail grooves 18a and 18b. The latch buttons 16a, 16b are biased by springs so as to be slidable in the left-right direction with respect to the upper case 10 (the springs are not visible in the drawing). The locking hooks 17a, 17b (refer to FIG. 1) pop out to the left and right at the lower portions of the rail grooves 18a, 18b (refer to FIG. 1) by the action of springs, and engage with concave portions formed in the rail portions 211a, 211b of the electrical device main body 201 shown in FIG. 1, thereby preventing the battery pack 1 from falling off. When the latch buttons 16a and 16b are pushed inward when the battery pack 1 is attached to the electrical device main body 201, the locking hooks 17a and 17b fixed in conjunction with the latch buttons 16a and 16b move inward, and the protruding state of the locking hooks 17a and 17b from the rail grooves 18a and 18b is released. After the protruding state is released, the battery pack 1 may be removed from the main body portion of the electrical device main body 201 by sliding the battery pack 1 in the extending direction of the rail grooves 18a and 18b. Through holes 19a, 19b (not visible in (B) of FIG. 2) are formed on the wall surface where the rail grooves 18a, 18b are formed, such that the locking portions (latch hooks) 17a, 17b (see FIG. 2) protrude from the outside.

The lower case (second case) 2 has a substantially rectangular parallelepiped shape with an open upper surface, and has a front side surface 3a, a rear side surface 3b, a right side surface 3c, a left side surface 3d, and a bottom surface 3e. The internal space of the lower case 2 has a volume sufficient to accommodate a separator 50.

Multiple slits 13a serving as cooling air outlets are provided in the inner portion of the stopper portion 15a. When the battery pack 1 is attached to the electrical device main body 201, the slits 13a are covered and closed so as not to be visible from the outside. When the battery pack 1 is connected to a charging device (not shown) for charging, the slits 13a are used as an air window for forcing cooling air to flow inside the battery pack 1. By rotation of a fan provided in the charging device, cooling air drawn into the battery pack 1 through a cooling air inlet (not shown) provided on the front wall of the lower case 2 of the battery pack 1 cools the battery cells and the like, and is discharged to the outside from the slits 13a. Moreover, the slits 13a may be configured to serve as a cooling air inlet to allow the cooling air to flow in the opposite direction.

A display portion 80 is provided on the rear slope of the raised portion 15. The display portion 80 is provided with four display windows 81-84, and a push button type switch button 85 is provided on the right side of the display window 81. The switch button 85 is an operation unit operated by the user. LEDs (light emitting diodes) (not shown) are arranged inside the display windows 81-84 and are lit from the inside of the display windows 81-84. The entire display portion 80 is covered with a laminate film, and the display windows 81-84 are configured by making part of the printed laminate film transparent or translucent such that light may pass through. The switch button 85 is a button operated by the user. When the switch button 85 is pressed, the remaining battery level is displayed on the display windows 81-84 according to the remaining battery level of the battery pack 1.

Of the slots 21-28, the slot 21 on the side closer to the rail groove 18a on the right side of the battery pack 1 serves as an insertion port for a charging positive terminal (C+ terminal), and the slot 22 serves as an insertion port for a discharging positive terminal (+ terminal). Moreover, the slot 27 on the side closer to the rail groove 18b on the left side of the battery pack 1 serves as an insertion port for a negative terminal (− terminal). In the battery pack 1, the positive side and the negative side of the power terminals for transmitting electric power are usually arranged so as to be sufficiently separated from each other, so when viewed from the cross section A-A (vertical plane) located at the left-right center, positive terminals are provided in the slots 21 and 22 at sufficiently separated positions on the right side, and the negative terminal is provided in the slot 27 at a sufficiently separated position on the left side. Between the positive terminals and the negative terminal, multiple signal terminals for signal transmission used for controlling the battery pack 1, the electrical device main body 201, or an external charging device (not shown) are arranged. Here, the four slots 23-26 for signal terminals are provided between power terminal groups. The slot 23 is a spare terminal insertion port, and no terminal is provided in this embodiment. The slot 24 is an insertion port for a T terminal for outputting a signal that serves as identification information of the battery pack 1 to the electrical device main body or the charging device. The slot 25 is an insertion port for a V terminal for inputting a control signal from an external charging device (not shown). The slot 26 is an insertion port for an LS terminal for outputting temperature information of the battery pack by a thermistor (temperature sensing element) (not shown) provided in contact with the battery cell. On the left side of the slot 27, which serves as an insertion port for the negative terminal (− terminal), the slot 28 for an LD terminal for outputting an abnormal stop signal from a battery protection circuit included in the battery pack 1, which will be described later, is further provided.

(A) of FIG. 3 is a cross-sectional view taken along line A-A of FIG. 2. The internal space formed by the upper case 10 and the lower case 2 accommodates ten cylindrical battery cells 41a-41j. The ten battery cells 41a-41j are stacked in two rows, each five in number, and fixed by the separator 50 made of non-conductor such as synthetic resin. The separator 50 is made by integrally molding non-conductive synthetic resin, and penetrates the battery cells 41a-41j in the left-right direction such that both end portions thereof are exposed from the openings. By using the separator 50, the battery cells 41a-41j may be kept in a state of non-contact with each other and separated a constant distance and stably arranged in the internal space defined by the upper case 10 and the lower case 2.

The battery cells 41a-41j use so-called 18650 size lithium-ion battery cells with a diameter of 18 mm and a length of 65 mm, which may be charged and discharged multiple times, and are arranged alternately such that the electrodes of the adjacent battery cells are opposite in direction. Moreover, the battery cells adjacent to each other in the front and rear are electrically and mechanically connected by metal plates (not shown). The size and number of battery cells of the battery pack of this invention are arbitrary, and this invention may be widely applied to any battery pack as long as the battery pack is in the shape of the separator 50 sandwiched between the upper case 10 and the lower case 2. Further, the shape of the battery cell fixed by the separator is not limited to a cylindrical shape, and may be a rectangular parallelepiped shape, a laminate shape, or other shapes.

The upper and lower adjacent battery cells 41a-41j are separated by a flat upper and lower partition wall 51e, and the front and rear adjacent battery cells 41a-41j are separated by flat front and rear partition walls 53a-53d. On the lower surface side of the separator 50, a bottom wall 51b bent into a cylindrical shape along the contours of the battery cells 41a-41d is formed.

A circuit board 70 is fixed on the upper side of the separator 50. The circuit board 70 is screwed to the separator 50 with two screws 79a and 79b. The circuit board 70 fixes (for example, solders) multiple connection terminals (to be described later in FIG. 6), and electrically connects these connection terminals to a circuit pattern (not shown). Various electronic elements (not shown here) such as a battery protection IC, microcomputer, PTC thermistor, resistor, capacitor, fuse, and light emitting diode are further mounted on the circuit board 70.

The upper case 10 and the lower case 2 may be separated from a division surface in the up-down direction, and are fixed by multiple screws arranged in the vertical direction (the same direction as the joining direction) when joined. Here, two screw holes (not visible in the drawing) are formed in each of the front side surface 3a and the rear side surface 3b of the lower case 2, and screw bosses 14a-14d (see FIG. 9 for reference numerals) having female threads are formed in corresponding portions of the upper case 10, and screws are screwed upward from below. In a conventional battery pack, an assembly of the separator 50 in a state where the circuit board 70 is fixed with screws and electrical wiring with the battery cells 41a-41j is completed is prepared, the assembly is sandwiched between the upper case 10 and the lower case 2, and the upper case 10 and the lower case 2 are fixed with screws in the sandwiched state. To be specific, the upper case 10 is covered with the lower case 2 while the assembly is accommodated therein, and the upper case 10 and the lower case 2 are screwed together. With this configuration, in the conventional separator, the bottom wall 51b abuts against the bottom surface of the lower case 2, and ribs extension portions 57a-57g (see FIG. 5) formed around the circuit board 70 and extending in the upward direction abut against the inner wall surface of the upper case 10 and are held. Although not shown in the drawing, a sponge-like cushioning material may be interposed between the bottom wall 51b and the bottom surface of the lower case 2.

In this embodiment, connecting portions (hooks 61 and 62) for connecting to the upper case 10 by engagement or the like are further formed on the extension portion formed around the circuit board 70 and extending upward. That is, the connecting portions (the hooks 61 and 62) are provided on the separator 50 so as to avoid the circuit board 70 without penetrating it. As a result, the area of the circuit board 70 in which components may be arranged may be ensured. On the other hand, inside the upper case 10, connected portions (concave portions 29a and 29b) corresponding to the hooks 61 and 62 are formed. By forming the hooks 61 and 62 and the concave portions 29a and 29b in this way, when assembling the upper case 10 and the lower case 2, the upper case 10 and the lower case 2 are fixed with screws in such a state that the protruding portions of the hooks 61 and 62 in the front-rear direction are positioned within the internal spaces of the concave portions 29a and 29b. With this configuration, when the upper case 10 and the lower case 2 are screwed, the assembly (composed of the circuit board 70, the battery cells 41a-41j, and the separator 50, for example) and the upper case 10 are automatically fixed by the hooks 61 and 62. Moreover, in the configuration of this embodiment, the division surface of the upper case 10 and the lower case 2 is configured as a horizontal opening, but it may be a division surface inclined with respect to the horizontal, a division surface with a step difference, or a division surface with a complicated shape such as a curved surface. That is, if separation of the separator 50 and the case 10 at one case (the upper case 10 as the first case) side and the separator 50 is hindered by the hook and the shape portion corresponding to the hook, it is arbitrary how to configure the hook and the corresponding shape.

(B) of FIG. 3 is an enlarged view of part D of (A). The hook 61 is made integrally with the separator 50, and extends toward the upper side of a positioning piece 54 of the separator 50 by a height h1 to form the extension portion, and further protrudes in the orthogonal direction (front side) from the height direction of the positioning piece 54 of the separator 50 by a distance L1 to form a connecting portion. When the upper case (first case) 10 and the lower case (second case) 2 are joined, the hook 61 connected to the first case 10 is provided on the separator 50, and the connected portion (the concave portion 29a) is formed at a portion corresponding to the hook 61 of the upper case 10. When the upper case 10 and the lower case 2 are joined, the hook 61 elastically deforms and fits into the recess of the concave portions 29a, whereby the hook 61 and the concave portion 29a are connected (locked state). The hook 61 and the concave portion 29a are maintained in a contact state or a non-contact state. The shape of the hook 61 is arbitrary, but it is set to have a length L1 of the portion protruding forward, and the upper surface of the protruding portion of L1 of the hook 61 is formed to be lower from the rear side to the front side, in other words, formed as an inclined surface 61a whose position decreases as it goes toward the outside of the separator 50. By forming the inclined surface 61a on the hook 61 in this way, when the upper case 10 and the separator 50 are connected, the inclined surface 61a slides with the inner wall surface of the upper case 10 such that the hook 61 is elastically deformed inward (the side away from the opposite wall surface of the upper case 10). When the separator 50 is normally assembled until the locking portion of the hook 61 (the portion having the length L1 and the range from the inclined surface 61a to a lower surface 61b when viewed in the up-down direction) comes to a position facing the concave portion 29a, the hook 61 returns from the elastically deformed state to its original state such that the locking portion (portion of length L1) of the hook is positioned in the concave portion 29a, resulting in the locked state shown in (B) of FIG. 3. The lower surface 61b of the hook 61 is a horizontal surface and the lower side surface of the concave portion 29a is also a horizontal surface. Thus, through their joint or abutment, the separator 50 remains connected (locked) with the upper case 10 by the action of the hook 61, even when the upper case 10 and the lower case 2 are disassembled. In the above, the shape of the hook 61 has been described with reference to Figure (B) of 3, but a hook 62 is also formed on the rear side of the separator 50 on the side of a positioning piece 55, and the concave portion 29b is formed at a portion of the upper case 10 facing the hook 62. The relationship between the hook 62 and the concave portion 29b is the same as the relationship between the hook 61 and the concave portion 29a.

(A) of FIG. 4 is a cross-sectional view taken along line B-B of FIG. 2. The upper case 10 is formed with eight slots 21-28 (see FIG. 2 for symbols), inside of which are battery-side terminal portions, that is, power terminals 31, 32, 37 and signal terminals 34-36, 38 are provided. Since the battery pack 1 of this embodiment is so-called multi-voltage compatible, lower side terminals 39a and 39b connected to the series connection terminals 229a and 229b are also provided. A positive terminal 32 and the lower side terminal

39a are connected to either the positive terminal of the upper cell unit composed of the upper battery cells 41a-41e arranged on the upper side or the positive terminal of the lower cell unit composed of the lower battery cells 41f-41j arranged on the lower side. A negative terminal 37 and the lower side terminal 39b are connected to either the negative terminal of the upper cell unit or the negative terminal of the lower cell unit. The lower surface of the circuit board 70 is held by ribs 58a-58g extending upward from an upper wall 51a of the separator 50, and the like. The vicinity of the leg portion of the battery-side terminal portion is covered with a board cover 78 made of synthetic resin.

Hooks 63 and 64 are formed on the left and right sides of the upper surface of the separator 50 and outside the circuit board 70. Concave portions 29c and 29d are provided in the inner wall surface of the upper case 10 facing the hooks 63 and 64, respectively. That is, the separator 50 is provided with connecting portions (hooks 63 and 64) to be connected to the upper case (first case) 10, and connected portions (the concave portions 29c and 29d) are formed at the portion corresponding to the hooks 63 and 64 in the upper case 10, such that the hooks 63 and 64 and the concave portions 29c and 29d are connected (or locked) when the upper case 10 and the lower case 2 are joined. The hook 63 has a shape similar to that of the hooks 61 and 62, and has a length L2 of the portion protruding in the lateral direction. The upper surface of the protruding portion of the length L2 of the hook 62 is formed with an inclined surface 63a that descends from the inside toward the outside. By forming the inclined surface 63a on the hook 63 in this way, when the lower case 2 and the upper case 10 are joined, the inclined surface 63a slides with the inner wall surface of the upper case 10 such that the hook 63 is elastically deformed inward (the side away from the opposite wall surface of the upper case 10). When the separator 50 is normally assembled until the locking portion of the hook 63 (the portion having the length L2 and the range from the inclined surface 63a to a lower surface 63b when viewed in the up-down direction) comes to a position facing the concave portion 29c, the hook 63 returns to its original state (recovering the elastic deformation), such that the locking portion (the portion having the length L2) is positioned in the concave portion 29c, resulting in the state shown in (B) of FIG. 4.

The lower surface 63b of the hook 63 is a horizontal surface, and the lower side surface of the concave portion 29c is also a horizontal surface. Thus, through their joint or abutment, the separator 50 remains connected with the upper case 10 even when the upper case 10 and the lower case 2 are disassembled. In the above, the shape of the hook 63 has been described with reference to (B) of FIG. 4, but the hook 64 and the concave portion 29d are similarly formed on the left side of the separator 50. Moreover, the connection state of the hooks 61-64 and the concave portions 29a-29d may be a firm fitting state in which the lower surface 63b of the hook 63 is in close contact with the concave portion 29c, or it may be a gentle engagement state in which the hooks 61-64 are in gentle contact with or separated from the concave portions 29a-29d by a slight distance. This is because the separator 50 itself is held by the upper case 10 and the lower case 2, unless the upper case 10 and the lower case 2 are separated from each other (for example, loosened screws, damaged screws, damaged lower case 2, etc.), fixation by the hooks 61-64 and the concave portions 29a-29d is not important.

FIG. 5 is a perspective view showing the appearance of the separator 50 alone shown in FIG. 3. FIG. 5 shows the state before the battery cells 41a-41j are attached. The separator 50 is a battery holding member for arranging and holding the multiple battery cells 41a-41j (see FIG. 3) in two rows up and down and five columns front and rear such that only the left and right sides, which are the two end portions of the battery cells, are open. When assembled, the battery cells 41a-41j are inserted into the cylindrical space of the separator 50, and the terminals exposed on the left and right sides of the separator are connected to each other by a connecting plate (not shown). The connection plate (not shown) is electrically connected to the circuit board 70 by a lead wire or metal plate (not shown). The separator 50 is made by molding a non-conductive material that does not conduct electricity, such as synthetic resin. Synthetic resin is characterized by its excellent vibration absorption characteristics due to its greater elasticity than metal.

The upper wall 51a of the separator 50 includes an arcuate surface along the outer edges of the cylindrical battery cells (not shown). Since the circuit board 70 is fixed to the upper side of the upper wall 51a by the two screws 79a and 79b (see FIG. 3), which are not shown, the upper wall 51a is formed so as to cover the entire cylindrical surfaces of the battery cells 41a-41e. Screw bosses 56a and 56b are formed at two locations near the rear end portion and the front end of the upper wall 51a. The upper wall 51a of the separator 50 is formed with multiple ribs 54a, 57a-57g extending upward to contact the upper case 10. Further, the multiple ribs 58a-58g are formed to abut on the bottom surface of the circuit board 70. Moreover, on the upper side of the circuit board 70, tab fixing portions 59a-59d for holding metal tabs for soldering the electrodes of the battery cells and the circuit board 70 are formed.

The positioning piece 54 for connecting with the inner wall surface of the lower case 2 is formed on a front wall surface 51c of the separator 50, and the hook 61 and the rib 54a are formed on the upper portion of the positioning piece 54. The positioning piece 55 is formed on the upper portion of a rear wall surface 51d of the separator 50, and the hook 62 is formed on the upper portion thereof. The hooks 63 and 64 are formed on the upper right side and the upper left side of the separator 50. As shown in FIGS. 3 and 4, the hooks 61-64 are engaged with the upper case 10. The method of manufacturing and assembling the battery pack 1 of this embodiment is the same as that of the conventional battery pack, in which an assembly of the battery cells 41a-41j, the circuit board 70, and the separator 50 with wiring completed is arranged inside the lower case 2, and the upper case 10 is aligned with the upper side of the separator 50, and then the upper case 10 and the lower case 2 are joined by four screws (not shown). After such an assembly procedure, the hooks 61-64 are engaged with the concave portions 29a-29d of the upper case 10. Moreover, after connecting the assembly of the upper case 10 and the separator 50, the lower case 2 may be joined (fixed with screws).

The separator 50 and the lower case 2 may be easily separated by removing the four screws (not shown) that fix the upper case 10 and the lower case 2 when the battery pack 1 is disassembled. However, since the hooks 61-64 and the upper case 10 are engaged with each other, the separator 50 remains connected to the upper case 10. As a result, there is no change in the positional relationship between the slots 21-28 of the upper case 10 and the terminal group (31, 32, 34-38, 39a, 39b). Since the positional relationship between the upper case 10 and the main body side terminal group fixed to the circuit board 70 does not shift in this way, even when the electrical device main body 201 is dropped from a high position and the case of the battery pack 1 is damaged, the relative positional relationship between the main body side terminals on the electrical device main body 201 side and the terminal group on the battery pack 1 side is less likely to shift, it is possible to greatly reduce the risk of electrical contact failure between terminals due to deformation of the terminals or the like.

The bottom wall 51*b* of the separator 50 has arcuate outer surfaces only near the left and right ends of the cylindrical battery cells 41*a*-41*j* (not shown), but no wall surfaces are formed near the left-right center. This is due to weight reduction and molding of the separator 50.

FIG. 6 is a view of the battery pack 1 of FIG. 1 with the upper case 10 removed, where (A) is a perspective view and (B) is a right side view. The material of the circuit board 70 is referred to as a printed circuit board, in which pattern wiring is printed with a conductor such as copper foil on a board impregnated with a resin that is insulating against the material, and a single-layer board, a double-sided board, and a multilayer board may be used. In this embodiment, a multilayer board is used to form wiring patterns on the upper layer surface (the upper side surface seen from FIG. 4) and the lower layer surface of the circuit board 70. Drawings of LSIs, ICs, other mounted electronic elements, and circuit patterns mounted on the circuit board 70 are omitted.

Multiple connection terminals (31, 32, 34-38) are laterally arranged and fixed to a slightly front side portion of the center of the circuit board 70 in the front-rear direction. Each of the connection terminals is made of metal. A total of two sets of horizontally extending arms by press working are used: one set on the left and right on the upper side, and one set on the left and right on the lower side. Each connection terminal has a leg portion penetrating from the upper surface (front surface) to the back surface (lower surface) of the circuit board 70, the leg portions are passed through multiple attachment holes formed in the circuit board 70 from the front surface to the back surface, and the leg portions are soldered to the back surface (lower surface) of the circuit board 70. This soldering is performed to the wiring pattern of the conductor provided on the back surface of the circuit board 70, thus the connection terminals (31, 32, 34-38) are fixed to the circuit board 70 and electrically connected to the wiring pattern by the soldering. Moreover, in the invention of the present application, as long as the connection terminals (31, 32, 34-38) are fixed by the circuit board 70 and the connection terminals (31, 32, 34-38) are positioned on the circuit board 70 side when the upper case 10 is removed as shown in (A) of FIG. 6, the connection terminals (31, 32, 34-38) and the circuit board 70 can be connected by any method, and other known connection terminal shapes and fixing methods to the circuit board 70 may be selected.

Three signal terminals (a T terminal 34, a V terminal 35, and a LS terminal 36) are provided between the positive terminal 32 and the negative terminal 37. Moreover, an LD terminal 38 is provided on the left side of the negative terminal 37 and the charging positive terminal 31 is provided on the right side of the positive terminal 32. As described above, after the electronic elements (not shown) are mounted on the circuit board 70 and the multiple connection terminals are fixed by soldering, the board cover 78 is placed around the connection terminals (31, 32, 34-38), and the circuit board 70 is fixed to the separator 50 with the two screws 79*a* and 79*b* after the surface of the circuit board 70 is hardened with a resin (not shown) to be dustproof and waterproof.

The hooks 61-64 (64 is invisible in the drawing) are formed at four locations near the upper peripheral edge of the separator 50. As may be seen from the right side view of (B) of FIG. 6, the upper end portions of the hooks 61-64 are formed so as to be positioned above the opening position (division surface) of the lower case 2 and below the circuit board 70. The hook 62 is arranged between two screw holes 4*c* and 4*d*. Thus, even if the connection state between the rear portions of the upper case 10 and the lower case 2 by the screw holes 4*c* and 4*d* is released for some reason, the connection state of the rear wall surface 51*d* of the separator 50 with the upper case 10 is maintained by the hook 62. Similarly, since the hook 61 is provided between two screw holes 4*a* and 4*b* (see FIG. 7 for 4*b*), even if the connection state between the front portions of the upper case 10 and the lower case 2 by the screw holes 4*a* and 4*b* is released, the connection state of the front wall surface 51*c* of the separator 50 with the upper case 10 is maintained by the hooks 61. As shown in (B) of FIG. 6, the battery cells 41*a*-41*j* and the circuit board 70 are electrically connected to each other by soldering connecting portions 75*b*, 76*a*, and the screws 79*a*, 79*b*, etc., which are lead wires or metal plates.

FIG. 7 is a top view of the battery pack 1 with the upper case 10 removed. Here, the hooks 63 and 64 provided on the left and right sides of the separator 50 are provided on both sides in the parallel direction of the multiple battery-side terminal portions (31, 32, 34-38), respectively, and the length in the front-rear direction is $L_f$. The position occupied by the length $L_f$ is provided at a position that partially overlaps the position occupied by a length $L_t$ occupied by the connection terminals (31, 32, 34-38) in the front-rear direction. In other words, by arranging the hooks 63 and 64 near the connection terminals 31 and 38, there is an effect that even if for some reason the side surface portions of the upper case 10 and the lower case 2 are separated due to the screw holes 4*a*-4*d*, the connection state between the separator 50 and the upper case 10 may be maintained in the vicinity of the connection terminals (31, 32, 34-38). Moreover, it is not necessary in this invention that the hooks 63 and 64 partially or entirely overlap with the portion where the length $L_t$ is located when viewed in the front-rear direction, it is sufficient if the range of length $L_t$ and the range of length $L_f$ is arranged at sufficiently close positions. Further, it is possible to provide multiple hooks 63 and 64 on the right side surface and left side surface of the separator 50, respectively, or hooks sufficiently long in the front-rear direction (for example, hooks longer than the length $L_t$ in the front-rear direction). Further, the hooks 63 and 64 may have any shape as long as the separator 50 and the upper case 10 may be locked when the upper case 10 and the lower case 2 are screwed together. Furthermore, the positional relationship between the hooks 61-64 and the concave portions 29*a*-29*d* may be reversed by forming the hooks inside the upper case 10 and forming the concave portions on the separator 50 side. Moreover, ribs 5*a*-5*e* (5*b* not shown) and 6*a*-6*e* (6*b* not shown) for keeping the battery cells 41*a*-41*e* from wobbling in the left-right direction are formed on the left and right sides of the inner wall surface of the lower case 2 at positions opposite to each other (see FIG. 3). Each rib is multiple plate-like pieces extending in the vertical (up-down) direction, and is molded integrally with the lower case 2.

Embodiment 2

FIG. 8 is a cross-sectional view showing a battery pack 1A according to a second embodiment of this invention, where (A) is a vertical cross-sectional view passing through the left-right center of the battery pack. The difference from the battery pack 1 of the first embodiment is that as hooks provided in the separator 50A, hooks (first connecting portions) 161 and 162 that engage with the upper case 10 and hooks (second connecting portion) 165 and 166 that engage with the lower case 2A are formed. The upper case 10 has the same components as that of the first embodiment shown in FIG. 3, including the provision of the concave portions 29*a* and 29*b*. On the other hand, concave portions 7*a* and 7*b* that engage with the hooks 165 and 166 are newly formed in the lower case 2A.

(B) of FIG. 8 is an enlarged view of the F portion of (A). As may be seen by comparing (B) of FIG. 8 and (B) of FIG. 3, the hooks 165 and 166 newly added to the separator 50A are convex portions extending forward or backward from part of the positioning pieces 54 and 55, and only the convex portions (hooks 165 and 166) are added while maintaining the basic shape of the separator 50 shown in FIG. 3. An inclined surface 166*a* is formed on the lower side of the hook 166, and a horizontal upper surface 166*b* is formed on the upper side. Similarly, an inclined surface 165*a* is formed on the lower side of the hook 165 on the front side, and a horizontal upper surface 165*b* is formed on the upper side. In this manner, inclined surfaces 161*a* and 162*a* of the hooks 161 and 162 engaging with the upper case 10 and the inclined surfaces 165*a* and 166*a* of the hooks 165 and 166 engaging with the lower case 2A are arranged in opposite directions, that is, symmetrical with respect to the division surface, so by simply sandwiching the separator 50A between the upper case 10 and the lower case 2A in the same assembly method as the conventional one, the separator 50A is connected (locked) to the upper case 10 and the lower case 2A by the action of the inclined surfaces of the hooks 161, 162, 165, and 166. In this state, the upper case 10 and the lower case 2A are fixed with four screws (not shown), so the battery pack may be more resistant to vibration and dropping than the conventional ones. Moreover, although not visible in FIG. 8, the hooks 63 and 64 (see FIG. 5) formed on the upper right side surface and the upper left side surface of the separator 50A are also formed with a hook that engages with the upper case 10 and a hook that engages with the lower case 2A toward the lower case 2A. Moreover, the left and right side surfaces may be provided with only the hooks 63 and 64 that are locked with the upper case 10. Further, in the embodiment of FIG. 8, the hooks (161-164) engaged with the upper case 10 and the hooks (165, 166, etc.) engaged with the lower case 2A are respectively formed at the same position in the horizontal direction, but it is not necessary to be the same position, and the hooks may be arranged at positions offset from each other in the horizontal direction.

In the battery packs 1 and 1A of the first and second embodiments, since the rail mechanism (guide portion) for guiding attachment to the electrical device main body 201 and the slot portion 20 exist on the upper case 10 side, it is important to fix the upper case 10 and the separators 50 and 50A by means of hooks and concave portions, but in a case of a battery pack in which for some reason the engagement is sufficient by the separator 50A and the lower case 2A alone, the hooks 161 and 162 to be fitted with the upper case may be omitted and only hooks 165-168 to be fitted with the lower case are formed.

Here, the upper case (first case) 10 will be described with reference to FIG. 9. FIG. 9 is a bottom perspective view of the upper case 10 alone of the battery packs 1 and 1A according to the first and second embodiments of this invention. The four screw bosses 14*a*-14*d* are formed on the front side wall surface of the upper case 10 for screwing with the lower case 2 (or 2A). Female threads (not visible in the drawing) are formed inside the screw bosses 14*a*-14*d*. On the left and right side portions (the left side portion is not visible in the drawing) of the inner wall surface of the upper case 10, in order to restrict movement of the battery cells 41*a*-41*e* (see FIG. 3) located on the upper side within the space defined by the upper case 10 and the lower case 2, multiple ribs (protruding portions) 30*a*-30*e* protruding inward from the inner wall of the upper case 10 are formed. The ribs 30*a*, 30*b*, and 30*e* are multiple of plate-shaped pieces extending in the vertical and lateral directions, respectively, and three pieces are formed here. Each of the ribs 30*c* and 30*d* is a single plate-like piece. The ribs 30*a*-30*e* are molded integrally with an upper case 10B. These ribs 30*a*-30*e* are provided so as to be continuous with the ribs 5*a*-5*e* and 6*a*-6*e* shown in FIG. 7 in the up-down direction.

The upper portions of the three plate-shaped pieces of the rib 30*b* are formed with notches that are recessed rightward from the left-right center line. The outline of this notch is the concave portion 29*c* described in FIG. 4. Although not visible in FIG. 9, the similar concave portion 29*d* is formed on the left side inner wall surface of the upper case 10 as well. Only by partially changing the shape of the existing portions (the rib 30*b*) in this way, the connected portions (the concave portions 29*c* and 29*d*) may be formed on the side of the upper case 10 while maintaining the existing function (prevention of wobbling of the battery cells).

The upper case 10 is provided with a latch mechanism. The latch mechanism includes the latch buttons 16*a*, 16*b*; locking portions (latch hooks) 17*a* and 17*b* formed integrally with the latch buttons 16*a* and 16*b*; springs (not visible in the figure) that bias the latch buttons 16*a* and 16*b* outward from left-right center; and a latch plate 91 for holding the latch buttons 16*a*, 16*b* and the springs to the upper case 10B. The upper sliding surfaces of the latch buttons 16*a* and 16*b* are held by ribs (not visible in the figure) formed on the inner wall of the upper case 10B, and the lower sliding surfaces thereof are held by ribs (not visible in the figure) formed on the upper surface of the latch plate 91. The latch plate 91 is fixed to the upper case 10 with a screw 92. Moreover, the latch plate 91 is fixed to the upper case 10 by the screw 92 on the side of the latch button 16*b*.

Embodiment 3

A third embodiment of this invention will now be described with reference to FIG. 10. In the third embodiment, the latch plate 91 forming the lower sliding surface as shown in FIG. 9 is integrally formed with a separator 50B. With this configuration, the latch plate 91 and the screw 92 for fixing the latch plate 91 to the upper case 10 are omitted, thereby reducing the assembly cost. The separator 50B has the hooks 61-64 and engages with the concave portions 29*a* and 29*b* (see FIG. 3) and the concave portions 29*c* and 29*d* (see FIG. 4) formed in the upper case 10B. Thus, if the separator 50B may also have a function corresponding to the latch plate 91, the installation of the latch plate 91 may be omitted, and further, the operation of screwing the latch plate 91 with the screw 92 during assembly may be omitted. By using the separator (to be described later in FIG. 10) of the third embodiment, the separator 50B is connected (locked) to the upper case 10B, such that the latch mechanism is held between the upper case 10B and the separator 50B, and the latch plate 91 and the screw 92 may be omitted.

(A) of FIG. 10 is a longitudinal cross-sectional view of a battery pack 1B of the third embodiment (corresponding to the cross-section of C-C in FIG. 2), and (B) is a plan view of the state after the upper case 10B of the battery pack 1B is removed. In the separator 50B of the third embodiment, latch holding portions 155 and 156 are formed on the lower sides of the latch buttons 16a (not visible in the figure) and 16b, which is different from the separator 50 of the first embodiment shown in FIG. 5. The latch holding portions 155 and 156 are rectangular parallelepiped, and their upper surfaces are the lower sliding surfaces of the latch buttons 16a and 16b. By adding the function of the latch plate 91 shown in FIG. 9 to the separator 50 in this way, the number of man-hours in the manufacturing process can be reduced. In order to provide the latch holding portions 155 and 156, as shown in (B) of FIG. 10, notch portions 71a and 71b which cut a part of a circuit board 70A into a rectangular shape are provided, and the latch holding portions 155 and 156 extend upward from the notch portions 71a and 71b. On the other hand, even if the latch holding portions 155 and 156 are provided, the hooks 61-64 may be configured in the same way as in the first embodiment. Moreover, in the battery pack of the third embodiment, it is sufficient to connect the upper case 10B to the lower case 2 connect by connecting the assembly of the separator 50 to the upper case 10B after locking (fitting) the hooks 61-64 with the concave portions 29a-29d (see FIG. 3, FIG. 4).

This invention has been described above based on the embodiments, but it is not limited to the above-described embodiments, and various modifications may be made without departing from the scope of the invention. For example, in the first and second embodiments, the separator 50 is configured to be held by the upper case 10 using the hooks 61-64 and 161-166 formed on the separator 50, but the same effect as that of the present invention can also be obtained even by forming multiple fastening holes (connecting portions) in the separator 50, forming screw bosses (connected portions) corresponding to the upper case 10 and into which screws are inserted, and connecting the upper case 10 and the lower case 2 after the separator 50 is screwed to the upper case 10 using multiple screws as fastening member passing through the fastening holes. In this case as well, it is possible the screws to pass through the circuit board 70, if the screws avoid the circuit board 70, a component arrangement region of the circuit board 70 may be secured.

What is claimed is:

1. A battery pack, comprising:
a first case having a slot portion for exposing a battery-side terminal portion and a guide portion for guiding attachment to an electrical device main body;
a second case for defining a space for accommodating a battery cell by being joined with the first case;
a separator holding the battery cell; and
a circuit board fixed to a side of the separator facing the first case;
the battery-side terminal portion fixed at a position corresponding to the slot portion of the circuit board and configured to be connectable to a main body side terminal portion of the electrical device main body,
wherein the separator has a connecting portion provided around the circuit board when viewed from above, at a position facing the first case, and
the first case has a connected portion connected to the connecting portion at a portion corresponding to the connecting portion,
wherein the connecting portion is one of a hook and a concave portion formed on the separator,
the connected portion is the other of the hook and the concave portion formed on the first case, and
when separating the first case and the second case in a joined state, the separator is held on the side of the first case by a locked state between the hook and the concave portion.

2. The battery pack according to claim 1, wherein the hook and the concave portion are maintained in a contact state or a non-contact state when the first case and the second case are joined together.

3. The battery pack according to claim 1, wherein a plurality of screw holes are provided on one side of the first case and the second case;
a plurality of female screws corresponding to the screw holes are provided on the other side of the first case and the second case;
the first case and the second case are screwed with a plurality of screws in a state where the separator is accommodated in the first case and the second case,
a longitudinal direction of the screw is oriented in the same direction as the joining direction; and
an extending direction of the connecting portion is perpendicular to the joining direction.

4. The battery pack according to claim 1, wherein the battery-side terminal portion has a plurality of terminals arranged in parallel on the circuit board, and
the connecting portion has a first connecting portion provided at a location located on both sides of the plurality of terminals in a parallel direction.

5. The battery pack according to claim 4, wherein the battery cell is cylindrical and supported by the separator so as to extend in the parallel direction of the plurality of terminals, and
the connecting portion has a second connecting portion provided at an end portion of the separator in a front-rear direction, near a center in the parallel direction.

6. The battery pack according to claim 5, wherein the second connecting portion is provided on both sides of the separator in the front-rear direction.

7. The battery pack according to claim 1, wherein the first case has a protruding portion that protrudes inward from an inner wall of the first case in order to restrict movement of the battery cell in the space for accommodating the battery cell defined by the second case being joined with the first case, and
the connected portion is provided on the protruding portion.

8. The battery pack according to claim 1, comprising:
a latch mechanism provided in the first case for attachment and detachment to and from the electrical device main body,
wherein the latch mechanism is positioned between the separator and the first case in a state in which the connecting portion and the connected portion are held.

9. A battery pack, comprising:
a first case having a slot portion for exposing a battery-side terminal portion and a guide portion for guiding attachment to an electrical device main body;
a second case for defining a space for accommodating a battery cell by being joined with the first case;
a separator holding the battery cell; and
a circuit board fixed to a side of the separator facing the first case;
the battery-side terminal portion fixed at a position corresponding to the slot portion of the circuit board and configured to be connectable to a main body side terminal portion of the electrical device main body,
wherein the separator has a connecting portion provided around the circuit board when viewed from above, at a position facing the first case,
the first case has a connected portion connected to the connecting portion at a portion corresponding to the connecting portion, wherein the connecting portion has a hole provided in the separator, and a fastening member provided separately from the separator and penetrating the hole, and the connected portion has a fastening hole into which the fastening member is inserted.

10. The battery pack according to claim 1, wherein the hook elastically deforms and fits into the concave portion.

11. An electrical device, comprising:

the battery pack according to claim 1; and an electrical device main body having a battery pack attachment portion to which the battery pack is attached, and a main body side terminal portion provided in the battery pack attachment portion and connected to a battery-side terminal portion.

12. An electrical device main body, comprising:

a battery pack attachment portion to which the battery pack according to claim 1 is attached; and a main body side terminal portion provided in the battery pack attachment portion and connected to a battery-side terminal portion of the battery pack.

\* \* \* \* \*